United States Patent [19]

Crowe

[11] Patent Number: 5,271,248
[45] Date of Patent: Dec. 21, 1993

[54] DUAL COOLING SYSTEM

[75] Inventor: Lawrence E. Crowe, Lindenwood, Ill.

[73] Assignee: Sundstrand Corporation, Rockford, Ill.

[21] Appl. No.: 749,314

[22] Filed: Aug. 23, 1991

[51] Int. Cl.$^5$ .............................................. H02K 9/00
[52] U.S. Cl. ................................... 62/505; 62/335; 62/513; 62/259.2; 310/52; 310/54; 310/59
[58] Field of Search ............... 62/79, 175, 335, 259.2, 62/505, 513; 310/52, 54, 59, 64

[56] References Cited

U.S. PATENT DOCUMENTS

| | | | |
|---|---|---|---|
| 3,015,222 | 1/1962 | Wellborn et al. | 230/139 |
| 3,089,969 | 5/1963 | Wiedemann | 310/53 |
| 3,306,074 | 2/1967 | Wilson | 62/505 |
| 3,388,559 | 6/1968 | Johnson | 62/505 X |
| 3,407,623 | 10/1968 | Richardson et al. | 62/197 |
| 3,408,828 | 11/1968 | Soumerai et al. | 62/505 X |
| 3,422,635 | 1/1969 | Trenkowitz | 62/505 X |
| 3,487,242 | 12/1969 | Richardson et al. | 310/53 |
| 3,623,546 | 11/1971 | Banthin et al. | 165/51 |
| 3,835,663 | 9/1974 | Appleton et al. | 62/505 |
| 4,182,137 | 1/1980 | Erth | 62/505 |
| 4,216,398 | 8/1980 | Kullmann | 62/505 X |
| 4,313,309 | 2/1982 | Lehman, Jr. | 62/175 |
| 4,364,241 | 12/1982 | Okamoto et al. | 62/505 |
| 4,611,137 | 9/1986 | Sutring | 310/54 |
| 4,753,284 | 6/1988 | Krause et al. | 310/59 X |
| 4,840,222 | 6/1989 | Lakin et al. | 310/64 X |
| 4,876,470 | 10/1989 | Geller | 310/59 |
| 4,896,062 | 1/1990 | Pollard | 310/54 X |
| 4,908,757 | 3/1990 | Jensen et al. | 310/54 |
| 4,922,146 | 5/1990 | Vanduyn | 310/59 |
| 4,936,112 | 6/1990 | Miller | 62/505 |
| 4,959,570 | 9/1990 | Nakamura et al. | 310/59 X |
| 5,034,638 | 7/1991 | McCabria | 310/52 X |
| 5,049,769 | 9/1991 | Reinhardt et al. | 310/64 |
| 5,065,058 | 11/1991 | Ferguson et al. | 310/52 X |
| 5,091,666 | 2/1992 | Jarcznski | 310/54 |
| 5,131,233 | 7/1992 | Cray et al. | 62/259.2 X |

Primary Examiner—Henry A. Bennet
Assistant Examiner—Christopher B. Kilner
Attorney, Agent, or Firm—Marshall, O'Toole, Gerstein, Murray & Borun

[57] ABSTRACT

A cooling system for first and second components operable at first and second maximum temperatures includes a first coolant path and heat transfer relationship with the first component and a second coolant path in heat transfer relationship with the second component and the first coolant path. The second coolant path removes heat from the second component and the first coolant path removes heat from the first component and the second coolant path so that the first and second components are maintained at temperatures less than the first and second maximum temperatures, respectively.

10 Claims, 4 Drawing Sheets

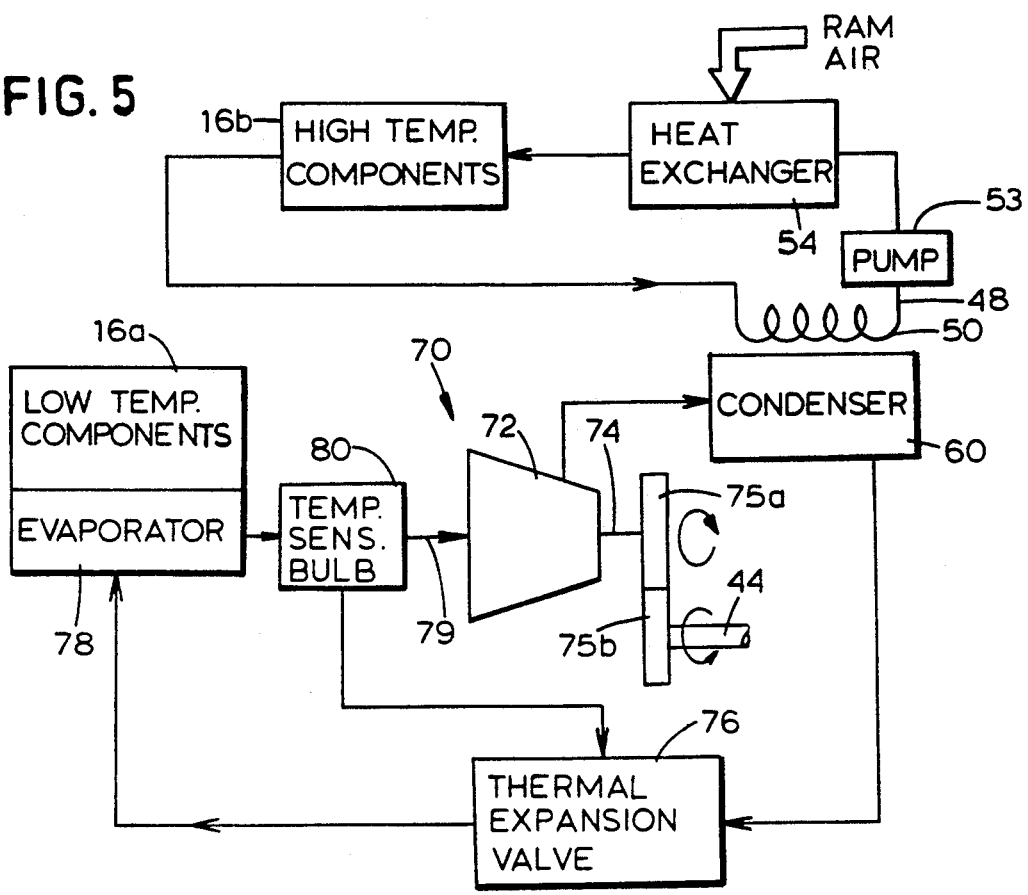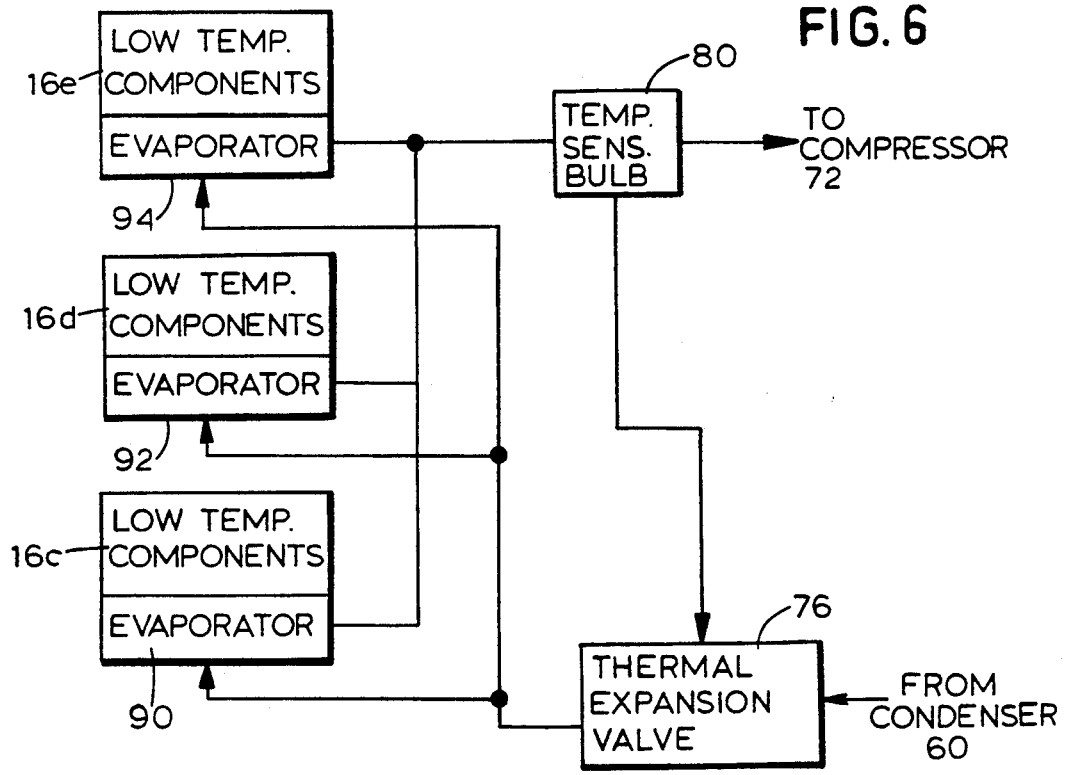

DUAL COOLING SYSTEM

TECHNICAL FIELD

The present invention relates generally to cooling devices, and more particularly to a cooling system for multiple components.

BACKGROUND ART

Power generation systems have been designed for applications, such as in aircraft, where a generator develops electrical power from motive power supplied by an aircraft jet engine. In order to operate at temperatures at or below a first maximum temperature, such a system circulates cooling oil in passages in the rotor and stator of the generator and delivers the oil to a heat exchanger that receives cooling fluid in the form of ram air.

In such aircraft power generation systems, the generator is typically of the synchronous type and thus develops variable-frequency power owing to the variable-speed motive power supplied by the aircraft jet engine. The variable-frequency power must be converted to fixed-frequency power by a power converter before such power can be used by loads on-board the aircraft. Such power converters utilize high power semiconductor switching devices which generate substantial amounts of heat and which must be operated at or below a second maximum operating temperature. Often, the maximum operating temperature of the electrical components of the power converter is less than the maximum operating temperature of the generator. Thus, if the same cooling system is to be used to cool the power converter components and the generator, the system must be oversized with respect to the cooling requirements imposed by the generator. Otherwise, different cooling systems must be used for the power converter and generator, thereby undesirably increasing the size and weight of the overall power generation system.

Banthin, et al., U.S. Pat. No. 3,623,546 discloses a cooling system for an electronic assembly mounted on a gas turbine engine. Electronic equipment is placed in a thermally conductive fluid within an annular container which is in turn mounted about a fuel line. The container is double-walled and coolant air is directed through a space between the walls. Cooling is accomplished by the coolant air and the engine fuel and efficiency is said to be improved by the fluid in the annular container.

Wiedemann, U.S. Pat. No. 3,089,969 discloses a cooling arrangement for a turbogenerator wherein an oil pump supplies cooling oil to a stator of the turbogenerator while hydrogen is supplied as a cooling fluid to a rotor of the turbogenerator.

Richardson, et al., U.S. Pat. No. 3,487,242 discloses a cooling system for a rotor of a dynamoelectric machine.

Wellborn, et al., U.S. Pat. No. 3,015,222 and Richardson, et al., U.S. Pat. No. 3,407,623 disclose cooling apparatus for refrigeration components.

SUMMARY OF THE INVENTION

In accordance with the present invention, a cooling system maintains first and second components at different operating temperatures.

More particularly, a cooling system for first and second components wherein the first component is operable at a first maximum temperature and the second component is operable at a second maximum temperature less than the first maximum temperature includes a first coolant path in heat transfer relationship with the first component and a second coolant path in heat transfer relationship with the second component and the first coolant path. The second coolant path removes heat from the second component and the first coolant path removes heat from the first component and the second coolant path so that the first and second components are maintained at temperatures less than the first and second maximum temperatures, respectively.

In accordance with the preferred embodiment, the second cooling path comprises a refrigerant loop having an evaporator in thermal contact with the second component and a condenser in thermal contact with the first coolant path. The refrigerant loop preferably further includes a compressor coupled between the evaporator and the condenser and driven by a prime mover.

In accordance with a further aspect of the present invention, the first coolant path includes a first heat exchanger disposed in thermal contact with the first component and a second heat exchanger coupled to the first heat exchanger and disposed in thermal contact with the cooling fluid. The first coolant path preferably extends through the generator in thermal contact therewith. The second coolant path preferably comprises a condenser disposed in the generator in thermal contact with the first coolant path, a thermal expansion valve coupled to the condenser, an evaporator in thermal contact with the second component and coupled to the thermal expansion valve and a compressor coupled between the evaporator and the condenser.

Still further in accordance with a preferred form of the invention, the generator includes a stator and the first coolant path comprises a conduit having a plurality of turns disposed about the stator and a heat exchanger in fluid communication with the conduit.

In accordance with yet another aspect of the present invention, a cooling system for components of an electrical power converter and a generator driven by a prime mover wherein the generator includes a stator and is operable at a first maximum temperature and the power converter components are operable at a second maximum temperature less than the first maximum temperature comprises an oil loop in heat transfer relationship with the generator stator and a refrigerant loop including a condenser in thermal contact with the oil loop, an expansion valve coupled to the condenser, an evaporator coupled to the expansion valve and disposed in thermal contact with the power converter components and a compressor coupled between the evaporator and the condenser and driven by the prime mover. The evaporator removes heat from the power converter components and the oil loop removes heat from the generator and the condenser so that the generator and the power converter components are maintained at temperatures less than the first and second maximum temperatures, respectively.

The condenser is preferably disposed in the generator stator. Also, the oil loop preferably includes a conduit having a plurality of turns disposed about the stator and a heat exchanger in fluid communication with the conduit wherein the conduit and heat exchanger conduct a circulating liquid in a closed path such that the circulating liquid absorbs heat in the generator stator and discharges heat through the heat exchanger into a cooling fluid.

Further in accordance with a preferred form of the present invention, the condenser is disposed about the turns of the conduit.

In one embodiment of the present invention, the power converter includes additional components and the cooling system further includes an additional evaporator coupled between the thermal expansion valve and the compressor in thermal contact with the additional components.

In a further embodiment of the present invention, the power converter includes additional components and the cooling system further includes an additional expansion valve coupled to the condenser and an additional evaporator coupled between the additional expansion valve and the compressor and disposed in thermal contact with the additional components.

The present cooling system is highly efficient and involves minimal size and weight since only those components which require extra cooling are cooled by the refrigeration loop. Hence, compressor size and weight are minimized.

BRIEF DESCRIPTION OF THE DRAWINGS

FIG. 5 comprises a combined schematic and block diagram of the cooling system of FIG. 3;

FIG. 6 comprises a block diagram of a first alternative embodiment of the present invention.

DESCRIPTION OF THE PREFERRED EMBODIMENTS

Figure 1:
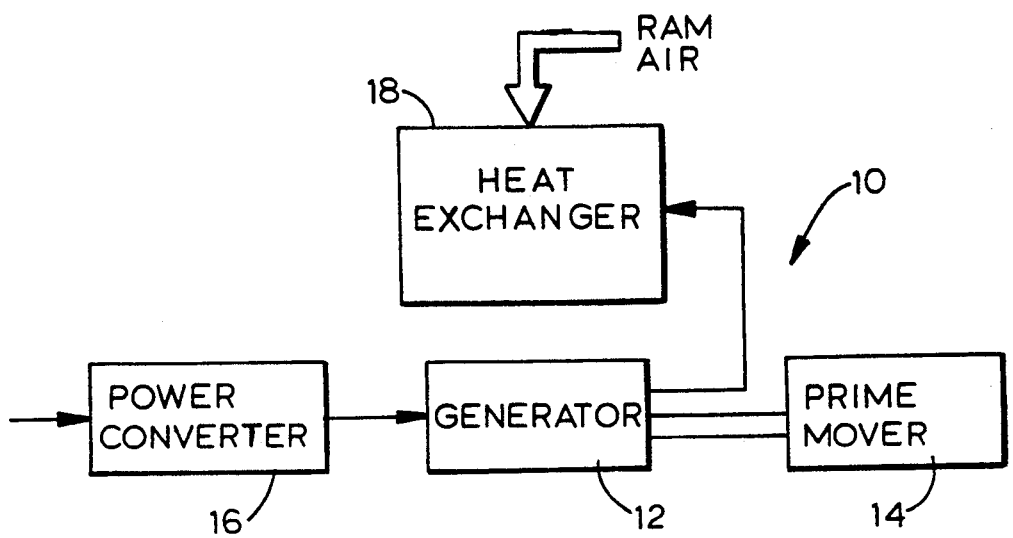
FIG. 1 comprises a block diagram of a prior art cooling system for a generator and power converter.

Referring now to FIG. 1, a prior art cooling system 10 is illustrated in conjunction with a generator 12 driven by a prime mover 14 and a power converter 16 which converts variable-frequency power produced by the generator 12 into constant-frequency power for AC loads (not shown). As indicated by the arrows circulating liquid is passed between the generator 12, the power converter 16 and a heat exchanger 18 for cooling purposes. This circulation is effected by a pump (not shown in FIG. 1 for the sake of clarity). More particularly, circulating liquid passes from the generator 12 to the heat exchanger 18 wherein the latter cools the circulating liquid using a cooling fluid. Typically, the cooling fluid comprises aircraft ram air, although a different source of cooling fluid may instead be used. The heat exchanger 18 delivers cooled circulating liquid to the power converter 16 and thence to the generator 12.

Figure 2:
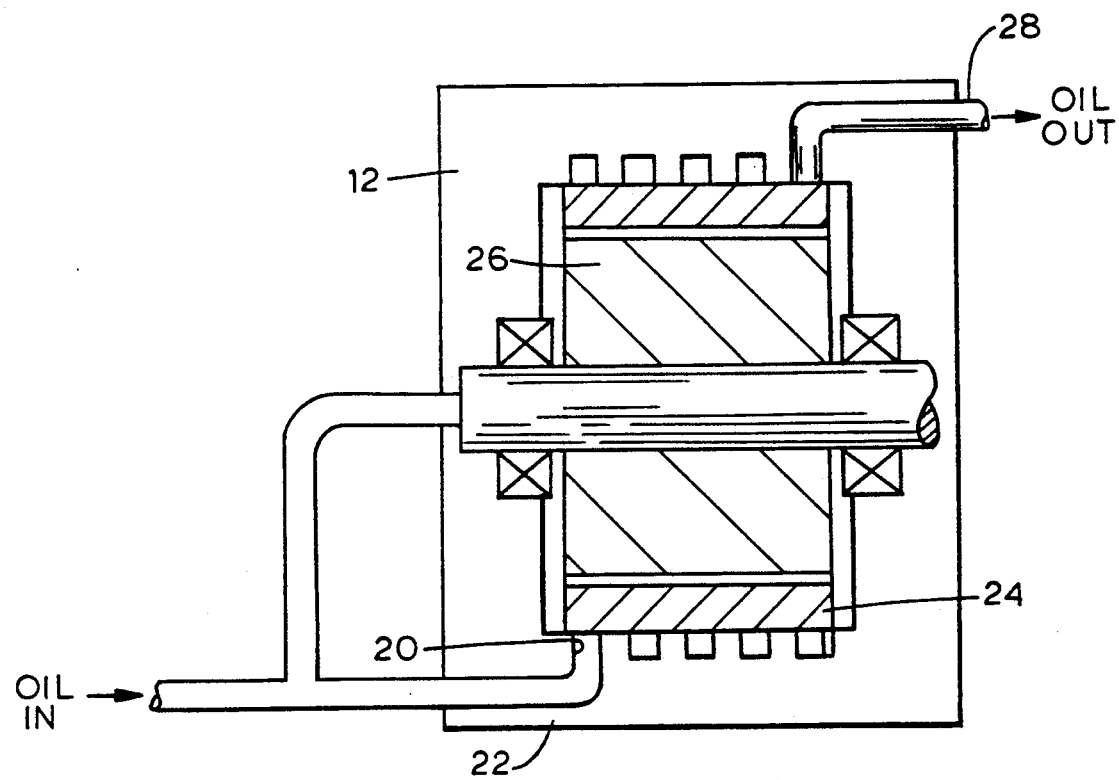
FIG. 2 comprises a simplified elevational view, partly in section, of the generator of FIG. 1.

FIG. 2 illustrates the generator 12 in greater detail. The cooling liquid in the form of oil is supplied to a spiral enclosed groove 20 formed in a housing 22 surrounding a stator 24 of the generator 12. The oil thus circulates about the stator 24 to cool same. In addition, oil is supplied to a rotor 26 and circulates through passages therein (not shown) to cool the rotor. The oil from the rotor is then passed to an outlet conduit 28 which is in turn coupled to the heat exchanger 18.

In the prior art system of FIGS. 1 and 2, the generator 12 is operable at a relatively high temperature, for example 121° C. However, the temperature of certain components of the power converter 16 cannot exceed a second maximum temperature lower than the maximum temperature of the generator 12. One way to cool the generator 12 and components of the power converter 16 using the cooling system of FIGS. 1 and 2 is to provide a cooling capacity which ensures that the temperature of the components of the power converter 16 does not exceed their maximum operating temperature. This, however, results in a greater than necessary cooling capacity for the generator 12. Thus, the heat exchanger 18 and other components of the cooling system are larger and heavier than what would otherwise be necessary if the power converter could operate at the operating temperature of the generator 12.

Figure 3:
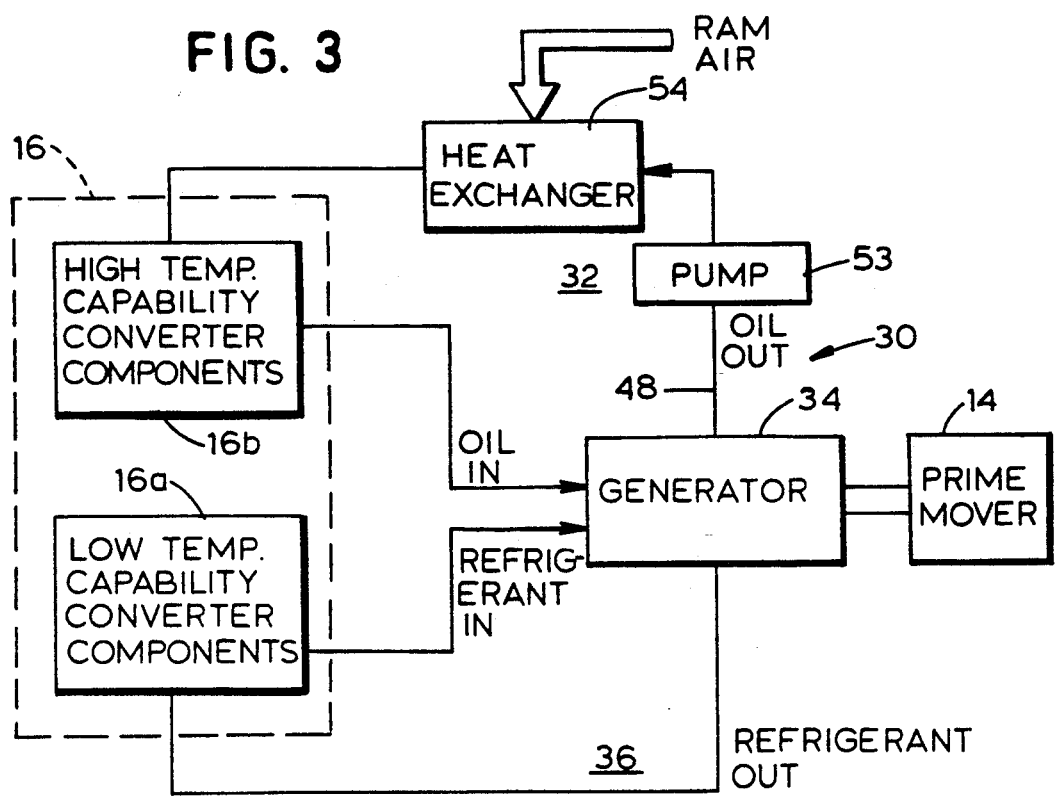
FIG. 3 comprises a block diagram of a cooling system according to the present invention.

FIG. 3 illustrates a block diagram of a cooling system 30 according to the present invention. The cooling system 30 includes a first coolant path 32 in heat transfer relationship with a generator 34 and a second coolant path 36 in heat transfer relationship with one or more converter components 16a, forming a portion of the power converter 16 and which must be operated at a relatively low maximum temperature. In addition, the second coolant path 36 is in heat transfer relationship with the first coolant path 32, as noted in greater detail below.

The power converter 16 further includes one or more converter components 16b which may be operated at a higher maximum temperature than the converter component 16a. The components 16b are connected in the first coolant path 32 and are thus cooled with the generator 34.

Figure 4:
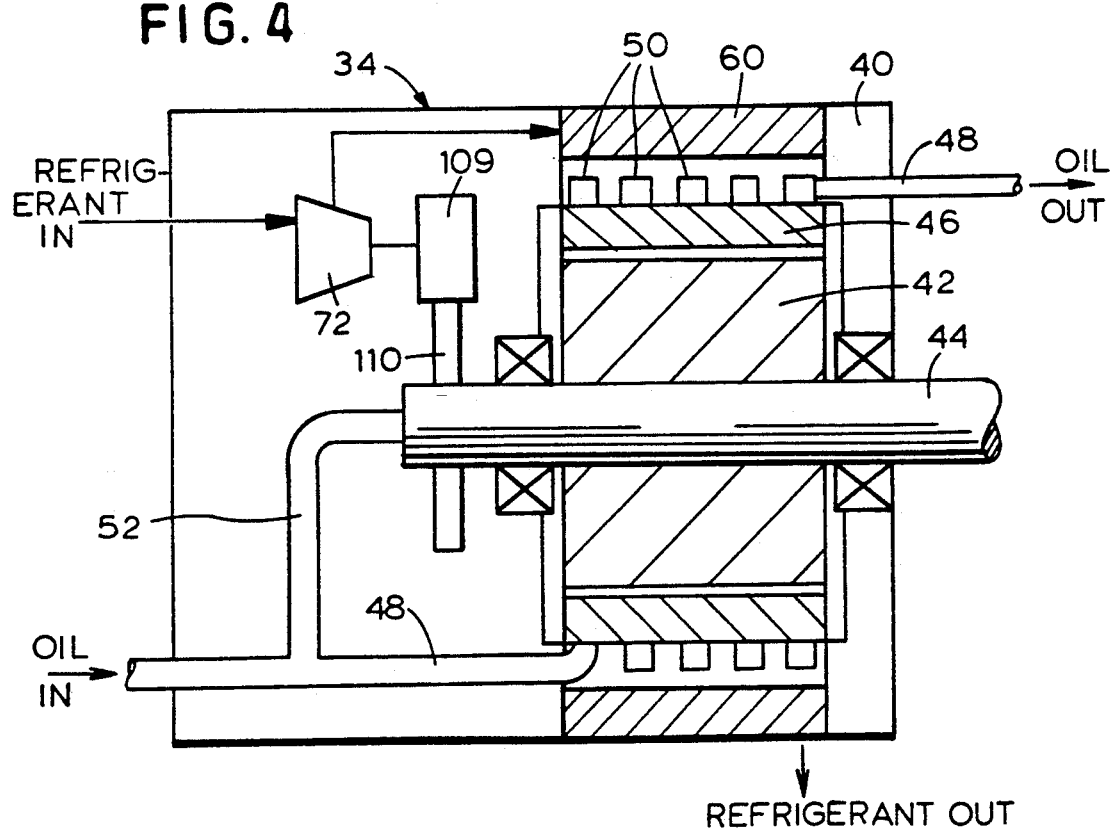
FIG. 4 comprises an elevational view, partly in section, of the generator of FIG. 3.

Referring now to FIG. 4, the generator 34 is disposed within a housing 40 and includes a rotor 42 mounted on a motive power shaft 44 and a stator 46. It should be noted that the windings of the generator 34 are not shown for the sake of simplicity. A conduit 48 includes a plurality of turns 50 that are disposed in the housing surrounding the stator 46. Branching from the conduit 48 is a further conduit 52 that is in turn connected in fluid communication with cooling channels (not shown) in the rotor 42. During operation of the cooling system of FIG. 3, circulating oil is forced by a main supply pump 53 through the conduits 48 and 52 and heat developed in the generator 34 is absorbed by the oil and is carried through the conduit 48 to a heat exchanger 54. The heat carried by the circulating oil in the conduit 48 is discharged through the heat exchanger 54 into a cooling fluid, such as ram air. The cooled circulating oil is then supplied to the converter components 16b and is thereafter returned to the generator 34. In the case of the oil flowing through the channels in the rotor 42, such oil is discharged into a sump where it is picked up by a scavenge pump (not shown) and returned to a boost pump (also not shown) which feeds the main supply pump 53.

Further during operation of the cooling system of FIG. 3, refrigerant is circulated to the low temperature converter components 16a to cool same. Heat developed in the vicinity of the components 16a is removed from the refrigerant by a condenser 60 which is disposed within the housing 40 surrounding the turns 50 of the conduit 48 in heat transfer relationship therewith. The condenser 60 and turns 50 thus comprise a heat exchanger.

FIG. 5 illustrates refrigeration apparatus 70 for cooling the components 16a. The apparatus 70 includes a compressor 72 which has a motive power input shaft 74 driven by gears 75a, 75b connected to the motive power shaft 44 of the generator 34. The compressor 72 is thus driven by the prime mover 14. The compressor supplies refrigerant to the condenser 60 which, as noted above, is in heat transfer relationship with the turns 50 of the conduit 48. The turns 50 and the circulating oil flowing therein act as a heat exchanger which provides heat to the heat exchanger 54 that in turn discharges the heat into the ram air. It should be noted that the temperature of the refrigerant in the condenser is typically higher than the temperature of the oil exiting the generator in the conduit 48.

The condenser 60 is coupled to a thermal expansion valve 76 and thence to an evaporator 78. The evaporator 78 is mounted in heat transfer relationship with the low temperature components 16a of the power converter 16. Refrigerant is returned to the compressor 72 from the evaporator 78 through a conduit 79 and the temperature of the refrigerant is detected by a temperature sensing bulb 80. The sensing bulb 80 controls the thermal expansion valve 76 to ensure that only refrigerant in gaseous form is returned to the compressor 72.

The compressor 72, condenser 60, thermal expansion valve 76, evaporator 78 and temperature sensing bulb 80 comprise a refrigeration path or circuit which removes heat from the low temperature component 16a. This heat is discharged via the condenser 60 at a temperature higher than the temperature of the oil exiting the generator, into the oil flowing through the turns 50 and the heat exchanger 54 and thence into the ram air. Desirably, the capacity of the compressor 72 is selected to provide only enough cooling as required for the low temperature components 16a so that the size and weight of the compressor may be minimized. This, in turn, ensures that the size and weight impact to the entire generating system of adding the second cooling circuit are kept to a minimum.

FIG. 6 illustrates a first alternative embodiment wherein the single evaporator 78 is replaced by multiple evaporators 90, 92, 94 that are coupled between the thermal expansion valve 76 and the compressor 72 via the conduit containing the temperature sensing bulb 80. In this case, the evaporators 90, 92 and 94 separately cool low temperature components 16c, 16d and 16e forming a part of the power converter 16. In this embodiment, the refrigerant flowrate to components 16c, 16d, 16e is controlled based on the temperature of the combined refrigerant flows exiting the evaporates 90, 92, 94 as sensed by the temperature sensing bulb 80. Accordingly, the operating temperatures of the component 16c, 16d, 16e cannot be precisely and independently controlled with this embodiment.

Figure 7:
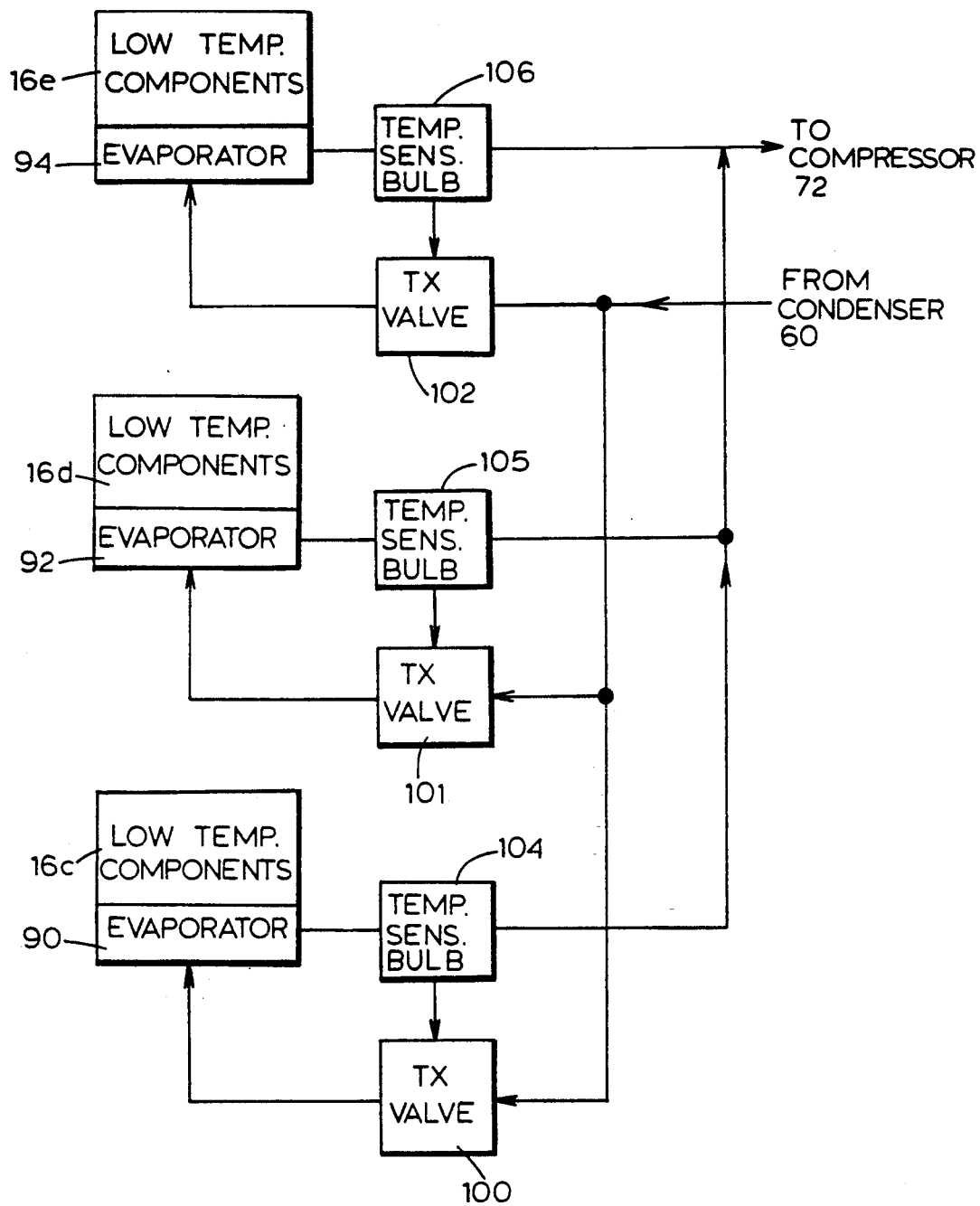
FIG. 7 comprises a block diagram of a second alternative embodiment of the present invention.

FIG. 7 illustrates a further alternative embodiment wherein the thermal expansion valve 76 and the temperature sensing bulb 80 are replaced by thermal expansion valves 100-102 and temperature sensing bulbs 104-106. The evaporators 90, 92 and 94 receive refrigerant from the condenser 60 via the thermal expansion valves 100-102, respectively. As with the embodiment of FIG. 6, the evaporators 90, 92 and 94 cool low temperature components 16c, 16d and 16e of the power converter 16. Refrigerant from the evaporators 90, 92 and 94 is returned to the compressor 72 via the temperature sensing bulbs 104-106, respectively. Unlike the embodiment of FIG. 6, the evaporators 90, 92 and 94 are capable of independent operation and are therefore capable of cooling the components 16c, 16d and 16e to different temperatures, as necessary or desirable.

In each of the foregoing embodiments, the overall size and weight of the cooling system are desirably kept small.

While the foregoing cooling system has been described in conjunction with a generator and associated power converter, it should be noted that the cooling system is readily adaptable in a general sense to any two components which are operable at first and second maximum temperatures wherein the second maximum temperature is less than the first maximum temperature. Also, more than two components can be accommodated by the cooling system, if desired.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A cooling system for first and second components wherein the first component generates heat and is operable at a first maximum temperature and the second component is operable at a second maximum temperature less than the first maximum temperature, comprising:

a first coolant path in heat transfer relationship with the first component; and a second coolant path in heat transfer relationship with the second component and the first coolant path;

wherein the second coolant path removes heat from the second component and wherein the first coolant path removes heat generated by the first component from the first component and removes heat from the second coolant path so that the first and second components are maintained at temperatures less than the first and second maximum temperatures, respectively;

wherein the second coolant path comprises a refrigerant loop including an evaporator in thermal contact with the second component and a condenser in thermal contact with the first coolant path; and wherein the first component receives motive power supplied by a prime mover and wherein the refrigerant loop further includes a compressor coupled between the evaporator and the condenser and driven by the prime mover.

2. A cooling system for first and second components wherein the first component generates heat and is operable at a first maximum temperature and the second component is operable at a second maximum temperature less than the first maximum temperature, comprising:

a first coolant path in heat transfer relationship with the first component; and a second coolant path in heat transfer relationship with the second component and the first coolant path;

wherein the second coolant path removes heat from the second component and wherein the first coolant path removes heat generated by the first component from the first component and removes heat from the second coolant path so that the first and second components are maintained at temperatures less than the first and second maximum temperatures, respectively; and wherein the first component comprises a generator and the second component comprises an electrical power converter.

3. The cooling system of claim 2, wherein the first coolant path extends through the generator in thermal contact therewith and wherein the second coolant path comprises a condenser disposed in the generator in thermal contact with the first coolant path, a thermal expansion valve coupled to the condenser, an evaporator in thermal contact with the electrical power converter and coupled to the thermal expansion valve and a compressor coupled between the evaporator and the condenser.

4. The cooling system of claim 3, wherein the generator includes a stator and wherein the first coolant path includes a conduit having a plurality of turns disposed about the stator and a heat exchanger in fluid communication with the conduit.

5. A cooling system for components of an electrical power converter and a generator driven by a prime mover wherein the generator includes a stator and is operable at a first maximum temperature and the power converter components are operable at a second maximum temperature less than the first maximum temperature, comprising:

an oil loop in heat transfer relationship with the generator stator; and a refrigerant loop including a condenser in thermal contact with the oil loop, an expansion valve coupled to the condenser, an evaporator coupled to the expansion valve and disposed in thermal contact with the power converter components and a compressor coupled between the evaporator and the condenser and driven by the prime mover;

wherein the evaporator removes heat from the power converter components and wherein the oil loop removes heat from the generator and the condenser so that the generator and the power converter components are maintained at temperatures less than the first and second maximum temperatures, respectively.

6. The cooling system of claim 5, wherein the condenser is disposed in the generator housing.

7. The cooling system of claim 5, wherein the oil loop includes a conduit having a plurality of turns disposed about the stator and a heat exchanger in fluid communication with the conduit, the conduit and heat exchanger conducting a circulating liquid in a closed path such that the circulating liquid absorbs heat in the generator stator and discharges heat through the heat exchanger into a cooling fluid.

8. The cooling system of claim 11, wherein the condenser is disposed about the turns of the conduit.

9. The cooling system of claim 5, wherein the power converter includes additional components and further including an additional evaporator coupled between the thermal expansion valve and the compressor in thermal contact with the additional components.

10. The cooling system of claim 5, wherein the power converter includes additional components and further including an additional expansion valve coupled to the condenser and an additional evaporator coupled between the additional expansion valve and the compressor and disposed in thermal contact with the additional components.

* * * * *